US012688608B2

(12) United States Patent
Zhang

(10) Patent No.: US 12,688,608 B2
(45) Date of Patent: Jul. 21, 2026

(54) LOCALIZATION METHOD AND APPARATUS FOR CONTROL APPARATUS, DEVICE, STORAGE MEDIUM AND COMPUTER PROGRAM PRODUCT

(71) Applicant: Beijing Zitiao Network Technology Co., Ltd., Beijing (CN)

(72) Inventor: Xiuzhi Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/849,334

(22) PCT Filed: Mar. 9, 2023

(86) PCT No.: PCT/CN2023/080420
§ 371 (c)(1),
(2) Date: Sep. 20, 2024

(87) PCT Pub. No.: WO2023/179369
PCT Pub. Date: Sep. 28, 2023

(65) Prior Publication Data
US 2025/0200797 A1     Jun. 19, 2025

(30) Foreign Application Priority Data
Mar. 21, 2022    (CN) .......................... 202210304608.8

(51) Int. Cl.
*G06T 7/73*          (2017.01)
*G06F 3/0346*        (2013.01)

(52) U.S. Cl.
CPC .............. *G06T 7/74* (2017.01); *G06F 3/0346* (2013.01); *G06T 2207/10028* (2013.01)

(58) Field of Classification Search
CPC ...................... G06T 7/74; G06T 2207/10028; G06F 3/0346
See application file for complete search history.

(56) References Cited

U.S. PATENT DOCUMENTS 10,705,606 B1 *   7/2020   Colonnese ................ G06T 7/20
11,947,122 B1 *   4/2024   Golovanov ............. G06F 3/012
(Continued)

FOREIGN PATENT DOCUMENTS

CN          206096621 U      4/2017
CN          109358754 A      2/2019
(Continued)

*Primary Examiner* — Ariel A Balaoing

(57) ABSTRACT

A localization and apparatus for a control apparatus, a device, a storage medium and a computer program product. The method is applied to a first control apparatus, and a camera is installed on the first control apparatus. The method includes: collecting, by the camera and at a moment T1, an external environment where the first control apparatus is located, thereby obtaining first point cloud data; acquiring inertial measurement unit data of the first control apparatus at the moment T1 and a first point cloud map of the external environment; and determining six-degrees-of-freedom data of the first control apparatus according to the first point cloud data, the inertial measurement unit data and the first point cloud map, where the first point cloud map includes historical point cloud data that is collected by the first control apparatus and a second control apparatus from the external environment relative to the moment T1. The method improves the localization precision of the control apparatus.

17 Claims, 3 Drawing Sheets

(56) References Cited

U.S. PATENT DOCUMENTS

| | | | |
|---|---|---|---|
| 2018/0217663 A1* | 8/2018 | Chandrasekhar | G06F 3/0346 |
| 2018/0330521 A1* | 11/2018 | Samples | F21V 23/0471 |
| 2019/0098255 A1 | 3/2019 | Bergmann et al. | |
| 2019/0356848 A1* | 11/2019 | Rydberg | G01S 1/7038 |
| 2020/0122405 A1* | 4/2020 | Bigos | H04B 5/20 |
| 2020/0210127 A1* | 7/2020 | Browy | G06F 3/14 |
| 2021/0104102 A1* | 4/2021 | Cavallo | G06T 15/40 |
| 2022/0379197 A1* | 12/2022 | Zhang | A63F 13/212 |

FOREIGN PATENT DOCUMENTS

| | | |
|---|---|---|
| CN | 110915208 A | 3/2020 |
| CN | 112822480 A | 5/2021 |
| CN | 113632030 A | 11/2021 |
| CN | 113689496 A | 11/2021 |

* cited by examiner

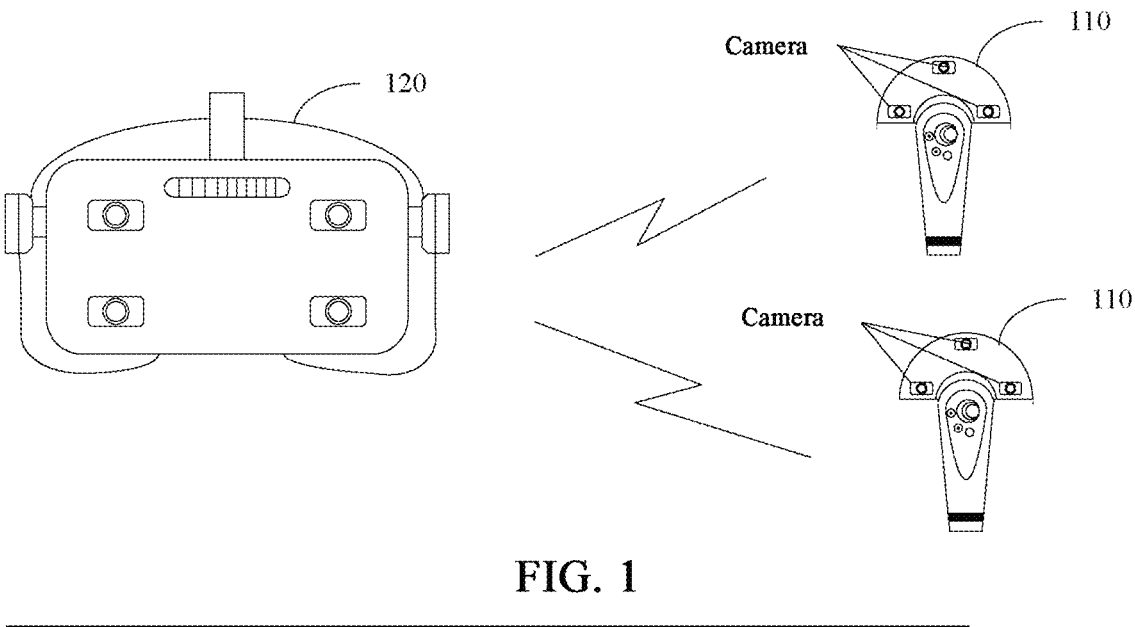

FIG. 1

| |
|---|
| A first control apparatus collects, by a camera and at a moment T1, an external environment where the first control apparatus is located, thereby obtaining first point cloud data |

S201

| |
|---|
| The first control apparatus acquires inertial measurement unit data of the first control apparatus at the moment T1 and a first point cloud map of the external environment, wherein the first point cloud map includes historical point cloud data that is collected by the first control apparatus and a second control apparatus from the external environment relative to the moment T1 |

S202

| |
|---|
| The first control apparatus determines six-degrees-of-freedom data of the first control apparatus according to the first point cloud data, the inertial measurement unit data and the first point cloud map |

LOCALIZATION METHOD AND APPARATUS FOR CONTROL APPARATUS, DEVICE, STORAGE MEDIUM AND COMPUTER PROGRAM PRODUCT

CROSS-REFERENCE TO RELATED APPLICATION(S)

This application is a U.S. National Stage Application of PCT Application Serial No. PCT/CN2023/080420, filed Mar. 9, 2023, which claims priority to Chinese Application No. 2022103046088, filed on Mar. 21, 2022, and entitled "Positioning Method And Apparatus For Control Apparatus, Device, Storage Medium And Computer Program Product", the disclosures of which are incorporated herein by reference in-its entirety their entireties.

FIELD

Embodiments of the present application relate to the technical field of virtual reality (VR), and in particular to a localization and apparatus for a control apparatus, a device, a storage medium and a computer program product.

BACKGROUND

A VR device may correspondingly adjust an image displayed on a head-mounted display (HMD) according to action changes such as a head and a hand of a user, thereby bringing an immersive experience feeling to the user, and thus the localization of an action of the user is an important factor affecting the VR experience feeling of the user.

At present, six-degrees-of-freedom tracking of the HMD is usually implemented by using an inside-out spatial localization technology in the prior art; and then, on this basis, a relative position relationship between a handle and the HMD is judged by solutions such as optical localization, ultrasonic localization and electromagnetic localization, so as to determine a world coordinate system of the handle to localize the handle, therefore it is possible to determine a change in the image displayed on the HMD, which corresponds to a change in the action of the handle, thereby bringing the immersive experience feeling to the user.

However, the above solution has the problem of low handle localization accuracy. For example, in the above ultrasonic localization solution, if another object is inserted between an acoustic wave receiver installed on the HMD and an acoustic wave emitter installed on the handle, electromagnetic waves transmitted therebetween are blocked or reflected, thereby affecting the localization accuracy of the handle.

SUMMARY

The present application provides a localization and apparatus for a control apparatus, a device, a storage medium and a computer program product, so as to improve the localization accuracy of the control apparatus.

In a first aspect, provided is a localization method for a control apparatus, wherein the method is applied to a first control apparatus, a camera is installed on the first control apparatus, and the method includes: collecting, by the camera and at a moment T1, an external environment where the first control apparatus is located, thereby obtaining first point cloud data; acquiring inertial measurement unit data of the first control apparatus at the moment T1 and a first point cloud map of the external environment; and determining six-degrees-of-freedom data of the first control apparatus according to the first point cloud data, the inertial measurement unit data and the first point cloud map, wherein the first point cloud map includes historical point cloud data that is collected by the first control apparatus and a second control apparatus from the external environment relative to the moment T1.

In a second aspect, provided is a localization apparatus, including: a collection module, an acquisition module and a first determination module, wherein the collection module is configured to collect, by a camera and at a moment T1, an external environment where a first control apparatus is located, thereby obtaining first point cloud data; the acquisition module is configured to acquire inertial measurement unit data of the first control apparatus at the moment T1 and a first point cloud map of the external environment; and the first determination module is configured to determine six-degrees-of-freedom data of the first control apparatus according to the first point cloud data, the inertial measurement unit data and the first point cloud map, wherein the first point cloud map includes historical point cloud data that is collected by the first control apparatus and a second control apparatus from the external environment relative to the moment T1.

In a third aspect, provided is a control apparatus, including a processor and a memory, wherein the memory is configured to store a computer program, and the processor is configured to call and run the computer program stored in the memory, so as to execute the method in the first aspect or various implementations thereof.

In a fourth aspect, provided is a computer-readable storage medium, configured to store a computer program, wherein the computer program causes a computer to execute the method in the first aspect or various implementations thereof.

In a fifth aspect, provided is a computer program product, including a computer program instruction, wherein the computer program instruction causes a computer to execute the method in the first aspect or various implementations thereof.

In a sixth aspect, provided is a computer program, wherein the computer program causes a computer to execute the method in the first aspect or various implementations thereof.

In the technical solutions of the present application, the first control apparatus may collect, by the mounted camera and at the moment T1, the external environment where the first control apparatus is located, thereby obtaining the first point cloud data, and then determine the six-degrees-of-freedom data of the first control apparatus according to the first point cloud data in combination with the acquired inertial measurement unit data of the first control apparatus at the moment T1 and the first point cloud map of the external environment where the first control apparatus is located. The first point cloud map includes the historical point cloud data that is collected by the first control apparatus and the second control apparatus from the external environment relative to the moment T1. During the above process, when the first control apparatus is a handle, there is no need to localize the handle by using a method in the prior art in which the six-degrees-of-freedom data of an HMD is used and a relative position relationship between the handle and the HMD is combined, but the six-degrees-of-freedom data of the handle is determined according to the point cloud data at the current moment of the environment where the handle is located, the IMU data of the handle and the point cloud map of the environment where the handle is located, so that the self-tracking of the handle can be realized, and accordingly, there is no cause to lower localization precision. For example, in the above operation of determining the relative position relationship between the handle and the HMD according to the ultrasonic localization solution, if another object is inserted between an acoustic wave receiver installed on the HMD and an acoustic wave emitter installed on the handle, electromagnetic waves transmitted therebetween are blocked or reflected, thereby affecting the localization accuracy of the handle. Moreover, when the six-degrees-of-freedom data of the handle is determined, the used point cloud map includes the historical point cloud data that is collected by the second control apparatus, such as the HMD, and the first control apparatus, such as the handle, from the located environment relative to the current moment, therefore the point cloud data included in the point cloud map is relatively rich, and thus the localization precision can be further improved. Therefore, the present application solves the problem in the prior art that the localization precision of the control apparatus, such as the handle, is relatively low, and improves the localization precision of the control apparatus.

BRIEF DESCRIPTION OF THE DRAWINGS

To illustrate technical solutions in the embodiments of the present invention more clearly, a brief introduction on the drawings which are needed in the description of the embodiments is given below. Apparently, the drawings in the description below are merely some of the embodiments of the present invention, based on which other drawings may be obtained by those ordinary skilled in the art without any creative effort.

FIG. 1 is a diagram of an application scenario provided in an embodiment of the present application;

FIG. 2 is a flowchart of a localization method for a control apparatus provided in an embodiment of the present application;

DETAILED DESCRIPTION OF EMBODIMENTS

Figure 3:
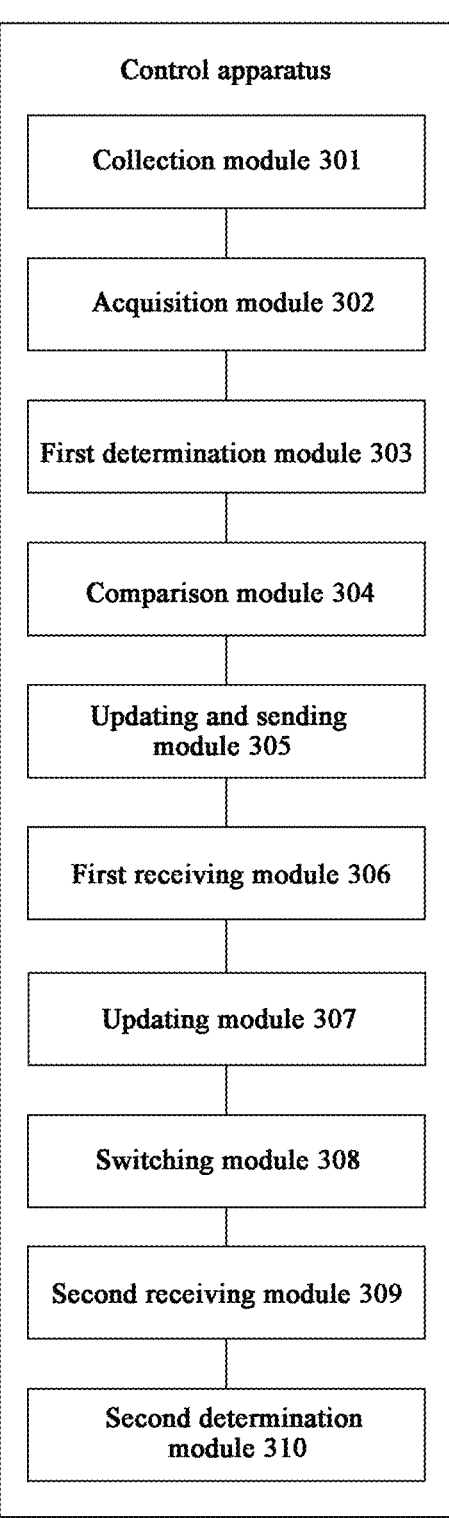
FIG. 3 is a schematic diagram of a localization apparatus provided in an embodiment of the present application.

A clear and complete description of the technical solutions in the embodiments of the present invention will be given below, in combination with the drawings in the embodiments of the present invention. Apparently, the embodiments described below are merely a part, but not all, of the embodiments of the present invention. All of other embodiments, obtained by those ordinary skilled in the art based on the embodiments in the present invention without any creative effort, fall into the protection scope of the present invention.

It should be noted that, the terms "first" and "second" and the like in the specification, claims and the above-mentioned drawings of the present invention are used for distinguishing similar objects, and are not necessarily used for describing a specific sequence or precedence order. It should be understood that the data used in this way may be interchanged under appropriate circumstances, so that the embodiments of the present invention described herein may be implemented in a sequence other than those illustrated or described herein. Furthermore, the terms "including" and "having", and any variations thereof are intended to cover non-exclusive inclusions, for example, processes, methods, systems, products or servers including a series of steps or units are not necessarily limited to those clearly listed steps or units, but may include other steps or units that are not clearly listed or are inherent to these processes, methods, products or devices.

In the embodiments of the present application, words such as "exemplary" or "for example" are used for representing examples, example illustrations or descriptions, and any embodiment or solution described as "exemplary" or "for example" in the embodiments of the present application should not be construed as being more preferred or advantageous than other embodiments or solutions. Exactly, the use of the word such as "exemplary" or "for example" is intended to present related concepts in a specific manner.

As described above, in the prior art, a relative position relationship between a handle and an HMD is judged by solutions such as optical localization, ultrasonic localization and electromagnetic localization, and then the handle is localized according to the relative position relationship in combination with 6-degrees-of-freedom tracking of the HMD. However, these solutions have the problem of relatively low localization precision of the handle. For example, in the ultrasonic localization solution, if another object is inserted between an acoustic wave receiver installed on the HMD and an acoustic wave emitter installed on the handle, electromagnetic waves transmitted therebetween are blocked or reflected, thereby affecting the localization accuracy of the handle.

In order to solve the above technical problems, the inventive concept of the present application is as follows: a first control apparatus may collect, by an installed camera and at a moment T1, point cloud data of an external environment where the first control apparatus is located, and then, determines six-degrees-of-freedom data of the first control apparatus according to the point could data in combination with acquired IMU data of the first control apparatus at the moment T1 and a point cloud map of the external environment. The point cloud map includes historical point cloud data that is collected by the first control apparatus and a second control apparatus from the external environment relative to the moment T1.

It should be understood that the technical solutions of the present application may be applied to, but is not limited to, the following scenarios:

Exemplarily, FIG. 1 is a diagram of an application scenario provided in an embodiment of the present application, as shown in FIG. 1, the application scenario may include a first control apparatus 110 and a second control apparatus 120, A camera is installed on the first control apparatus 110, and first control apparatus 110 may communicate with the second control apparatus 120.

In some implementations, the first control apparatus 110 may be a handle in a VR all-in-one machine, which is not limited in the present application.

In some implementations, as shown in FIG. 1, the camera installed on the first control apparatus 110 may be three fisheye cameras located on the first control apparatus 110, which is not limited in the present application.

It should be understood that the fisheye camera has a relatively large angle of view range, which may generally reach about 160 degrees, so that the fisheye camera can better photograph large-range scenes within a short distance.

In some implementations, the second control apparatus 120 may be an HMD, such as a head-mounted display in the VR all-in-one machine, which is not limited in the present application.

It should be understood that, the number of first control apparatuses, the number of second control apparatuses and the number of cameras in FIG. 1 are merely illustrative, and in fact, any number of first control apparatuses, any number of second control apparatuses and any number of cameras may be set according to actual situations, which is not limited in the present application.

After the application scenarios of the embodiments of the present application are introduced, the technical solutions of the present application are described in detail below;

FIG. 2 is a flowchart of a localization method for a control apparatus provided in an embodiment of the present application, the method may be executed by the first control apparatus 110 and the second control apparatus 120 shown in FIG. 1, but is not limited thereto, and as shown in FIG. 2, the method may include the following steps:

S201: the first control apparatus collects, by a camera and at a moment T1, an external environment where the first control apparatus is located, thereby obtaining first point cloud data;

S202: the first control apparatus acquires inertial measurement unit data of the first control apparatus at the moment T1 and a first point cloud map of the external environment, where the first point cloud map includes historical point cloud data that is collected by the first control apparatus and the second control apparatus from the external environment relative to the moment T1; and S203: the first control apparatus determines six-degrees-of-freedom data of the first control apparatus according to the first point cloud data, the inertial measurement unit data and the first point cloud map.

The camera is installed on the first control apparatus.

It should be noted that, in the following embodiments of the present application, the technical solutions of the present application will be described in detail by taking it as an example that the first control apparatus 110 is a handle in a VR all-in-one machine and the second control apparatus 120 is a head-mounted display in the VR all-in-one machine.

In some implementations, the external environment where the handle is located may be a security area set by the handle in an initial mode. The security area is an area where a user may move and which is set before the user experiences a VR scenario. For example, the security area may be set as a square area with a side length of 1 meter, which is not limited in the present application.

It should be noted that, the specific setting of the security area and the initial mode of the handle will be described in detail in the following embodiments regarding the initial mode, and thus details are not described herein again.

It should be understood that, the first point cloud map in S202 includes the historical point cloud data that is collected by the handle and the head-mounted display from the external environment relative to the moment T1. The point cloud data in an area range, which is easily collected by the head-mounted display, may be collected by the camera of the handle, therefore the point cloud data included in the first point cloud map is relatively rich, and thus the localization accuracy of the handle can be further improved.

In some implementations, the handle may acquire inertial measurement unit data via an inertial measurement unit inside the handle.

It should be understood that, the inertial measurement unit is an apparatus for measuring the angular velocity and the acceleration of an object in a three-dimensional space, and elements mainly included in the inertial measurement unit include gyroscopes, accelerometers and magnetometers. Generally, one inertial measurement unit may generally include three single-axis gyroscopes and three single-axis accelerometers. The gyroscope may detect the angular velocity of the object, and the accelerometer may detect the acceleration of the object, so that the data directly measured by the inertial measurement unit is acceleration and angular velocity, however, the inertial measurement unit may implement an indirect measurement value by performing integration, that is, the inertial measurement unit may perform once integration on the angular velocity to calculate an angle, that is, calculate a relative posture, and perform twice integration on the acceleration to acquire a distance, that is, calculate a relative position, therefore the inertial measurement unit data of the handle may represent the relative position and the relative posture of the handle.

However, when the relative position and the relative posture are calculated, data referenced by the inertial measurement unit is the data at a previous moment, therefore an error is accumulated over time. In this way, when the handle determines the six-degrees-of-freedom data of the handle according to the inertial measurement unit data at the moment T1, it is necessary to collect the point cloud data of the environment where the handle is located at the moment T1, so as to correct the error; and in addition, it is also necessary to determine the six-degrees-of-freedom data of the handle in combination with the first point cloud map of the environment where the handle is located and by the simultaneous localization and mapping (SLAM) technology. The six-degrees-of-freedom data may represent the position and the posture of the handle, in the real world, in a coordinate system corresponding to the point cloud data at the moment T1, that is, the position and the posture in a coordinate system corresponding to the first point cloud map of the environment where the handle is located.

The degree of freedom may be divided into two types: translation and rotation, the translation is divided into three types, namely, forward/backward, upward/downward, leftward/rightward. The rotation is divided into three types, namely, pitch, roll and yaw. That is, the three types of degrees of freedom of translation and the three types of degrees of freedom of rotation constitute 6 degrees of freedom. The three degrees of freedom of translation correspond to the relative position in the inertial measurement unit data, and the three degrees of freedom of rotation correspond to the relative posture in the inertial measurement unit data. No matter how complex any possible motion of a rigid body is, it may be expressed by a combination of translation and rotation, that is, it may be expressed by the six-degrees-of-freedom data. Therefore, after the six-degrees-of-freedom data of the handle is determined, the motion situations of the handle in the real world can be accurately judged, therefore mapping in a VR scenario can be realized on this basis, that is, an image displayed on the head-mounted display is correspondingly adjusted, thereby bringing an immersive experience feeling to the user.

It should be understood that, the SLAM technology may be applied to wide technical fields, for example: the technical field of VR, the technical field of robots, the technical field of unmanned aerial vehicles, the technical field of unmanned driving, and the like. The SLAM technology is mainly used for solving the problems of localization and mapping when an object moves in an unknown environment. In the technical field of VR, six-degrees-of-freedom data of the handle and the HMD in a three-dimensional space may be calculated by the SLAM technology, and a map with a more real visual effect may also be constructed, so that an overlaying effect of a virtual object is rendered for a current angle of view of the user, and thus the virtual object is more authentic and is free of the sense of conflict.

According to different sensors, the SLAM technology may be classified into 2 Dimensions/3 Dimensions simultaneous localization and mapping (2D/3D SLAM) based on a laser radar, RGB+depth map simultaneous localization and mapping (RGB-D SLAM) based on a depth camera, visual simultaneous localization and mapping (VSLAM) based on a visual sensor, and a visual inertial odometry (VIO) based on a visual sensor and an IMU. For example, in the technical field of VR, the 6DOF data of the handle may be acquired via the VIO.

In some implementations, the handle may compare whether there is a difference between the first point cloud data collected at the moment T1 and the first point cloud map. In a case where there is a difference between the first point cloud data and the first point cloud map, the handle may update a difference part between the first point cloud data and the first point cloud map into the first point cloud map, and send the difference part between the first point cloud data and the first point cloud map to the head-mounted display.

It should be noted that, during the process of determining the six-degrees-of-freedom data via the SLAM technology, the handle compares whether there is a difference between the first point cloud data collected at the moment T1 and the first point cloud map, so that the handle may compare whether there is a difference between the first point cloud data collected at the moment T1 and the first point cloud map by using the process of determining the six-degrees-of-freedom data via the SLAM technology.

In some implementations, when a target condition is satisfied, the handle may update the difference part between the first point cloud data and the first point cloud map into the first point cloud map, and send the difference part between the first point cloud data and the first point cloud map to the head-mounted display.

In some implementations, the target condition includes at least one of the following that: a preset duration after the moment T1 is reached; or a cumulative size of the difference part between the first point cloud data and the first point cloud map and a difference part between point cloud data, which is collected by the camera of the handle from the external environment after the moment T1, and the first point cloud map reaches a preset size. In this way, the number of times that the handle updates or sends the difference part between the first point cloud data and the first point cloud map may be reduced, thereby reducing the power consumption.

In some implementations, the head-mounted display may also determine the six-degrees-of-freedom data by using a method similar to that of the handle. For example, the head-mounted display may collect the external environment via an own camera and at the moment T1, thereby obtaining second point cloud data, and determine its own six-degrees-of-freedom data in combination with its own inertial measurement unit data and the first point cloud map.

It should be noted that, since the first point cloud map may be updated, the handle may collect, at the moment T1, the first point cloud data and determine its own six-degrees-of-freedom data according to the first point cloud data in combination with its own inertial measurement unit data and the first point cloud map. The head-mounted display may also collect the point cloud data of the environment where the head-mounted display is located and determine its own six-degrees-of-freedom data according to the point cloud data in combination with its own inertial measurement unit data and the first point cloud map. In this way, the handle and the head-mounted display use the same first point cloud map to respectively determine the six-degrees-of-freedom data, therefore it can be ensured that the motion situations of the handle in the real world and the motion situations of the head-mounted display in the real world are consistent with motion situations correspondingly displayed in a virtual space.

In some implementations, the handle may receive, which is sent by the head-mounted display, a difference part between the second point cloud data and the first point cloud map, and may update the difference part between the second point cloud data and the first point cloud map into the first point cloud map. The second point cloud data is point cloud data obtained by the head-mounted display by collecting the external environment at the moment T1 via its own camera.

It should be understood that, the handle may receive the difference part, which is sent by the head-mounted display, between the second point cloud data and the first point cloud map, the handle may also send the difference part between the first point cloud data and the first point cloud map to the head-mounted display; and furthermore, both the handle and the head-mounted display may update the difference part between the second point cloud data and the first point cloud map and the difference part between the first point cloud data and the first point cloud map into the first point cloud map, that is, the handle and the head-mounted display may update the first point cloud map by exchanging the collected point cloud data. In this way, not only can the point cloud data included in the first point cloud map be richer when the handle or the head-mounted display determines the six-degrees-of-freedom data, thereby improving the accuracy of the determined six-degrees-of-freedom data, but the handle and the head-mounted display can also use the same point cloud data to determine the respective six-degrees-of-freedom data, so that the handle and the head-mounted display can be tracked under the same coordinate system, thereby ensuring that respective corresponding motion changes of the handle and the head-mounted display are consistent with changes in images displayed in the head-mounted display when the motion changes are mapped, and thus ensuring the user experience. For example, the same coordinate system mentioned above may be a world coordinate system, which is not limited in the present application.

In some implementations, the handle may store the first point cloud map in a target database. For example, the target database may be a local database of the handle or a cloud database of the handle, which is not limited in the present application. Similarly, the head-mounted display may also store the first point cloud map in the target database.

In some implementations, when the handle needs to store the first point cloud map in the target database, the handle may simultaneously store an identifier of the external environment where the handle corresponding to the first point cloud map is located, for example, an identifier of a preset security area. The identifier of the security area may be used for uniquely representing the security area. For example, the identifier of the security area may be a name of the security area, which is not limited in the present application.

Exemplarily, assuming that the security area set by the user is a square area with a side length of 1 meter, which is located at a central position of a conference room 1, the identifier of the security area is a security area 1, and the first point cloud map is a point cloud map of the security area 1. Then, when the handle needs to store the first point cloud map in the target database, the handle may simultaneously store the identifier, that is, the security area 1, of the security area.

It should be understood that, the method of the head-mounted display for storing the point cloud map is similar to the method of the handle for storing the point cloud map, and thus details are not described herein again in the present application.

In some implementations, the target database may be a database shared by the handle and the head-mounted display. The shared database may be a local database of the handle, or may be a local database of the head-mounted display, or may be a cloud database, which is not limited in the present application.

In some implementations, after determining the 6-degrees-of-freedom data, the handle may send the six-degrees-of-freedom data to the head-mounted display. After receiving the six-degrees-of-freedom data sent by the handle, the head-mounted display may correspondingly adjust, according to the 6-degrees-of-freedom data, an image displayed on the head-mounted display.

Exemplarily, assuming that the user is required to make an action of opening the window in a VR scenario experienced by the user, then when the user makes the action of opening the window by hand, the handle may use the fisheye camera to collect the point cloud data of the environment at this time, acquire the inertial measurement unit data of the handle via the inertial measurement unit, combine the first point cloud map, then determine the six-degrees-of-freedom data of the handle via the SLAM technology, and send the six-degree-of-freedom data to the head-mounted display. After receiving the six-degrees-of-freedom data sent by the handle, the head-mounted display may adjust the image displayed on the head-mounted display to an image in which the window has been opened.

In some implementations, after acquiring the inertial measurement unit data, the handle may send the inertial measurement unit data to the head-mounted display. After receiving the inertial measurement unit data sent by the handle, the head-mounted display may pre-judge the motion of the handle, so that the image displayed on the head-mounted display can be pre-adjusted before the six-degrees-of-freedom data of the handle is obtained, so as to reduce the situation where a delay is generated when the handle determines the six-degrees-of-freedom data and sends the six-degrees-of-freedom data to the head-mounted display, resulting in inconsistency between changes in the image displayed on the head-mounted display and changes in the motion of the handle.

In some implementations, the handle may send a time synchronization message to the head-mounted display. After receiving the time synchronization message, the head-mounted display may determine, according to the time synchronization message, a time difference between a time system of the handle and a time system of the head-mounted display, so that when data interaction is performed between the handle and the head-mounted display, the time system of the handle and the time system of the head-mounted display are kept consistent. The time synchronization message includes a time in the time system of the handle.

In some other implementations, the head-mounted display may send a time synchronization message to the handle, the handle may receive the time synchronization message, and determine, according to the time synchronization message, a time difference between the time system of the head-mounted display and the time system of the handle, so that when the handle and the head-mounted display perform data interaction, the time system of the handle and the time system of the head-mounted display are kept consistent. The time synchronization message includes a time in the time system of the head-mounted display.

Exemplarily, assuming that a start-up time of the head-mounted display is T1, a start-up time of the handle is T2 and T2 is later than T1, then after the handle and the head-mounted display are started up, the head-mounted display may send, to the handle, a time synchronization message including the time T1, after receiving the time synchronization message, the handle may determine according to the time T1 and the time T2, a time difference between the time system of the head-mounted display and the time system of the handle, so that the time system of the handle and the time system of the head-mounted display are kept consistent.

In some implementations, before S201, a mode of the handle may be switched from an initial mode to a self-tracking mode in any one of the following manners, but is not limited to:

Manner 1: before the handle collects the first point cloud data, the handle may acquire a mode switching instruction. In response to the mode switching instruction, the handle may switch the mode of the handle from the initial mode to the self-tracking mode according to the mode switching instruction. The initial mode may be a mode in which the handle is operated by an arm model, and the self-tracking mode is a mode of the model when performing S201 to S204.

Exemplarily, the mode switching instruction may be a press operation of the user for a certain button on the handle, or operations of the user for a certain area on a screen of the handle, such as click, double click, long press, slide and floating touch gesture and the like, and may also be a press operation of the user for a certain button on the head-mounted display, or operations of the user for a certain area on a screen of the head-mounted display, such as click, double click, long press, slide and floating touch gesture and the like, which is not limited in the present application.

Manner 2: after the initial mode ends, the mode of the handle is automatically switched from the initial mode to the self-tracking mode. The present application will describe the initial mode of the handle in detail in the following embodiments.

It should be understood that the manner of switching the mode of the handle from the initial mode to the self-tracking mode is not limited in the present application.

In some implementations, after the handle and the head-mounted display are started up, the handle enters the initial mode, and needs to complete menu selection and the setting of the security area in the initial mode.

It should be understood that, before the security area is set, the point cloud data collected by the handle and the point cloud data collected by the head-mounted display have no unified coordinate system, the handle may send its own inertial measurement unit data to the head-mounted display, and the head-mounted display may determine three-degrees-of-freedom data of the handle according to the inertial measurement unit data sent by the handle: data of three types of degrees of freedom of rotation, that is, pitch, roll and yaw, that is, the relative pose of the handle. However, since there is no unified coordinate system, positions of the handle and the head-mounted display in the same coordinate system cannot be determined. On this basis, the head-mounted display may determine the position of the handle in combination with the arm model in the head-mounted display, or the head-mounted display may also determine a relative position and a relative pose of the handle and the head-mounted display by photographing the handle via a camera of the head-mounted display, and calculate the position of the handle via transformation. In this way, the head-mounted display may acquire the position and the posture of the handle, and then may complete the setting of the security area and the menu selection. Moreover, since the coordinate system is established based on the point cloud data in the security area, after the setting of the security area is completed, the handle and the head-mounted display may be unified to the same coordinate system.

In some implementations, the menu selection in the initial mode may include: selection of a VR scenario, selection of a network to be connected, such as selection of wireless fidelity (WiFi). The security area refers to an area where a user may move and which is set before the user experiences the VR scenario, and the security area may be a square area with a side length of 1 meter in the environment where the user is located when the user experiences the VR scenario, or may be a square area with a length of 1 meter and a width of 0.5 meters in the environment, and the present application does not limit the specific content of menu selection, the range of the security area, and the like.

In some implementations, when the handle is in the initial mode, the user may perform a press operation on a button on the handle, and the head-mounted display may complete the menu selection or the setting of the security area in initial operation in response to the press operation of the user. The user may also use the handle to rotate, for example, the user may use the handle to draw out the range of a security area to be set, and the head-mounted display may complete the menu selection or the setting of the security area in the initial operation in response to the rotation operation of the user. The present application does not limit a method for menu selection and a method for setting the security area, and the like.

In some implementations, when setting the security area, the head-mounted display may collect, at a moment T2, point cloud data of an environment where the head-mounted display is located, and search for whether the point cloud data is stored in the target database. In a case where the point cloud data is stored in the target database, that is, a point cloud map stored in the target database includes the point cloud data collected at the moment T2, the head-mounted display may directly set, as the security area, a security area corresponding to the point cloud map.

In some other implementations, when setting the security area, the head-mounted display may collect, at the moment T2, the point cloud data of the environment where the head-mounted display is located, and search for whether the point cloud data is stored in the target database. In a case where the point cloud data is not stored in the target database, that is, the point cloud map stored in the target database does not include the point cloud data collected at the moment T2, then the head-mounted display may reset the security area in cooperation with the handle.

In some other implementations, when setting the security area, the head-mounted display may collect, at the moment T2, the point cloud data of the environment where the head-mounted display is located, and search for whether the point cloud data is stored in the target database. In a case where the point cloud data is stored in the target database, that is, the point cloud map stored in the target database includes the point cloud data collected at the moment T2, the head-mounted display may query whether the user needs to use the security area corresponding to the point cloud map, and in a case where the user confirms that the security area corresponding to the point cloud map needs to be used, the head-mounted display may set, as the security area, the security area corresponding to the point cloud map. In a case where the user confirms that the security area corresponding to the point cloud map does not need to be used, the head-mounted display may reset the security area in cooperation with the handle.

In some implementations, in a case where it is necessary to reset the security area, the head-mounted display may send, to the handle, the point cloud data which is collected at the moment T2 from the environment where the head-mounted display is located, that is, the handle may receive historical point cloud data that is collected by the head-mounted display from the external environment where the head-mounted display is located relative to the moment T2, and then the handle and the head-mounted display may both construct a second point cloud map according to the historical point cloud data. The second point cloud map is a point cloud map corresponding to the reset security area, and the handle and the head-mounted display may both use the second point cloud map to determine their own six-degrees-of-freedom data in the self-tracking mode.

In some other implementations, in a case where it is unnecessary to reset the security area, that is, the point cloud map stored in the target database includes the point cloud data collected at the moment T2, the head-mounted display may send, to the handle, a difference part between the point cloud data collected at the moment T2 and the point cloud map, and update the difference part into the point cloud map. After receiving the difference part, which is sent by the head-mounted display, between the point cloud data collected at the moment T2 and the point cloud map, the handle may update the difference part into the point cloud map stored in the handle.

In summary, the technical solutions provided in the above embodiments bring at least the following beneficial effects: the first control apparatus may collect, by the installed camera and at the moment T1, the external environment where the first control apparatus is located, thereby obtaining the first point cloud data, and determine the six-degrees-of-freedom data of the first control apparatus in combination with the acquired inertial measurement unit data of the first control apparatus at the moment T1 and the first point cloud map of the external environment where the first control apparatus is located. The first point cloud map includes the historical point cloud data that is collected by the first control apparatus and the second control apparatus from the external environment relative to the moment T1. During the above process, when the first control apparatus is a handle, there is no need to localize the handle by using a method in the prior art in which the six-degrees-of-freedom data of an HMD is used and a relative position relationship between the handle and the HMD is combined, but the six-degrees-of-freedom data of the handle is determined according to the point cloud data at the current moment of the environment where the handle is located, the IMU data of the handle and the point cloud map of the environment where the handle is located, so that the self-tracking of the handle can be realized, and accordingly there is no cause to lower localization precision. For example, in the above operation of determining the relative position relationship between the handle and the HMD according to the ultrasonic localization solution, if another object is inserted between an acoustic wave receiver installed on the HMD and an acoustic wave emitter installed on the handle, electromagnetic waves transmitted therebetween are blocked or reflected, thereby affecting the localization accuracy of the handle. Moreover, the point cloud map used when the six-degrees-of-freedom data of the handle is determined includes the historical point cloud data that is collected by the second control apparatus, such as the HMD, and the first control apparatus, such as the handle, from the located environment relative to the current moment, therefore the point cloud data included in the point cloud map is relatively rich, and thus the localization precision can be further improved. Therefore, the present application solves the problem in the prior art that the localization precision of the control apparatus, such as the handle, is relatively low, and improves the localization precision of the control apparatus.

Further, when the target condition is satisfied, the handle may update the difference part between the first point cloud data and the first point cloud map into the first point cloud map, and send the difference part between the first point cloud data and the first point cloud map to the head-mounted display. For example, the target condition may include at least one of the following that: a preset duration after the moment T1 is reached; or a cumulative size of the difference part between the first point cloud data and the first point cloud map and a difference part between point cloud data, which is collected by the camera of the handle from the external environment after the moment T1, and the first point cloud map reaches a preset size. In this way, the number of times that the handle updates or sends the difference part between the first point cloud data and the first point cloud map may be reduced, thereby reducing the power consumption.

Further, in the initial mode, the handle may receive the point cloud data sent by the head-mounted display, and may update or construct the same point cloud map as the head-mounted display according to the point cloud data, so that it can be ensured that the handle and the head-mounted display can both determine respective six-degrees-of-freedom data in the self-tracking mode of the handle according to the same point cloud map, and thus it can be ensured that the motion situations of the handle in the real world and the motion situations of the head-mounted display in the real world are consistent with motion situations correspondingly displayed in the virtual space.

FIG. 3 is a schematic diagram of a localization apparatus provided in an embodiment of the present application, the localization apparatus may be a handle 110 shown in FIG. 1, and the localization apparatus includes: a collection module 301, an acquisition module 302, and a first determination module 303.

The collection module 301 is configured to collect, by a camera and at a moment T1, an external environment where a first control apparatus is located, thereby obtaining first point cloud data.

The acquisition module 302 is configured to acquire inertial measurement unit data of the first control apparatus at the moment T1 and a first point cloud map of the external environment.

The first determination module 303 is configured to determine six-degrees-of-freedom data of the first control apparatus according to the first point cloud data, the inertial measurement unit data and the first point cloud map.

The first point cloud map includes historical point cloud data that is collected by the first control apparatus and a second control apparatus from the external environment relative to the moment T1.

In some implementations, the localization apparatus further includes: a comparison module 304, and an updating and sending module 305. The comparison module 304 is configured to compare whether there is a difference between the first point cloud data and the first point cloud map. The updating and sending module 305 is configured to: in a case where there is a difference between the first point cloud data and the first point cloud map, update a difference part between the first point cloud data and the first point cloud map into the first point cloud map, and send the difference part between the first point cloud data and the first point cloud map to the second control apparatus.

In some implementations, the updating and sending module 305 is configured to: when a target condition is satisfied, update the difference part between the first point cloud data and the first point cloud map into the first point cloud map, and send the difference part between the first point cloud data and the first point cloud map to the second control apparatus.

In some implementations, the target condition includes at least one of the following that: a preset duration after the moment T1 is reached; or a cumulative size of the difference part between the first point cloud data and the first point cloud map and a difference part between point cloud data, which is collected by the camera from the external environment after the moment T1, and the first point cloud map reaches a preset size.

In some implementations, the localization apparatus further includes: a first receiving module 306 and an updating module 307. The first receiving module 306 is configured to receive a difference part, which is sent by the second control apparatus, between second point cloud data and the first point cloud map. The updating module 307 is configured to update the difference part between the second point cloud data and the first point cloud map into the first point cloud map. The second point cloud data is point cloud data obtained by the second control apparatus by collecting the external environment at the moment T1 via a camera of the second control apparatus.

In some implementations, the localization apparatus further includes: a switching module 308. The switching module 308 is configured to switch a mode of the first control apparatus from an initial mode to a self-tracking mode. The initial mode is a mode in which the first control apparatus is operated by an arm model.

In some implementations, the localization apparatus further includes: a second receiving module 309 and a second determination module 310. The second receiving module 309 is configured to: when the mode of the first control apparatus is the initial mode, receive historical point cloud data that is collected by the second control apparatus from the external environment relative to a moment T2. The second determination module 310 is configured to obtain a second point cloud map according to the historical point cloud data that is collected by the second control apparatus from the external environment relative to the moment T2.

In some implementations, the first point cloud map is stored in a target database. The target database is a database shared by the first control apparatus and the second control apparatus.

It should be understood that the apparatus embodiment and the method embodiment on the control apparatus side may correspond to each other, and similar descriptions may refer to the method embodiment corresponding to the control apparatus. To avoid repetition, details are not described herein again.

Specifically, the localization apparatus shown in FIG. 3 may execute the method embodiment on the control apparatus side, and the foregoing and other operations and/or functions of each module in the localization apparatus shown in FIG. 3 are respectively intended to implement corresponding flows of the method embodiment on the control apparatus side, and thus for conciseness, details are not described herein again.

The method embodiment on the control apparatus side in the embodiments of the present application have been described above from the perspective of a functional module in combination with the drawings. It should be understood that the functional module may be implemented in a form of hardware, or may be implemented by an instruction in a form of software, or may be implemented by a combination of hardware and software modules. Specifically, the steps in the method embodiments in the embodiments of the present application may be completed by using an integrated logic circuit of hardware in a processor and/or an instruction in the form of software, and the steps of the method disclosed in combination with the embodiments of the present application may be directly executed and completed by a hardware decoding processor, or may be executed and completed by using a combination of hardware and software modules in a decoding processor. Optionally, the software module may be located in a mature storage medium in the art, such as a random access memory, a flash memory, a read-only memory, a programmable read-only memory, an electrically erasable programmable memory and a register. The storage medium is located in the memory, and the processor reads information in the memory and completes the steps in the above method embodiment in combination with the hardware thereof.

Figure 4:
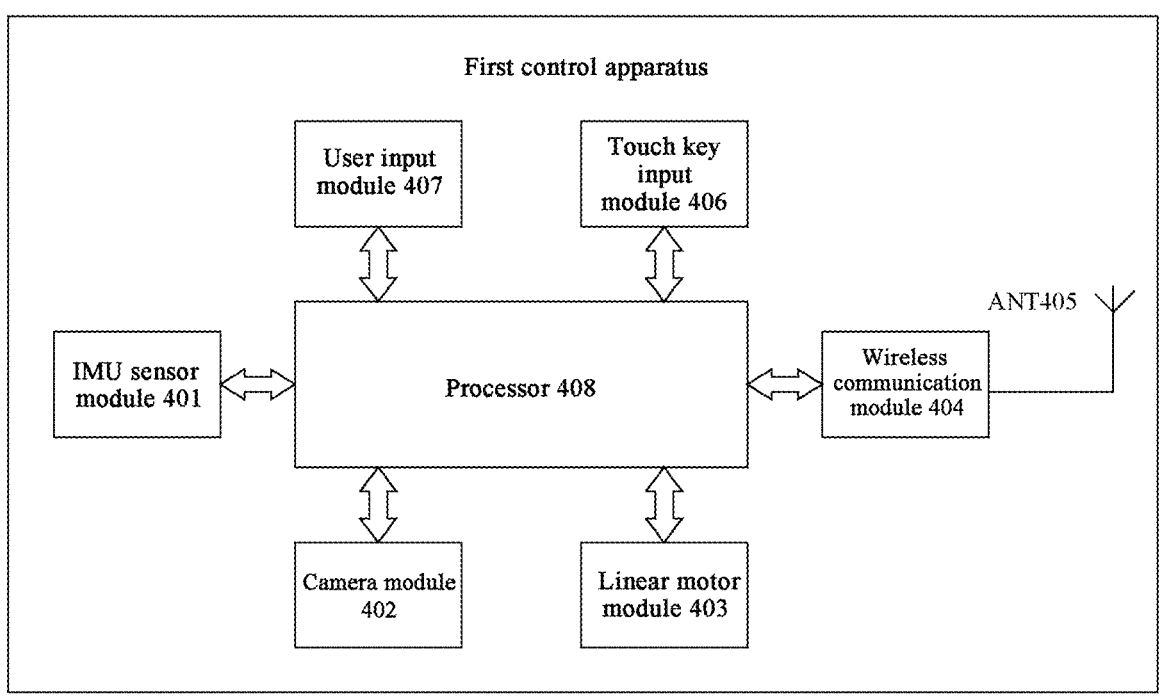
FIG. 4 is a schematic block diagram of a first control apparatus 400 provided in an embodiment of the present application.

FIG. 4 is a schematic block diagram of a first control apparatus 400 provided in an embodiment of the present application, and the first control apparatus 400 may be a handle in the above method embodiments.

As shown in FIG. 4, the first control apparatus 400 may include one or more of the following components: an IMU sensor module 401, a camera module 402, a linear motor module 403, a wireless communication module 404, an ANT 405, a touch key input module 406, a user input module 407, and a processor 408.

The IMU module 401 is configured to detect inertial measurement unit data of the first control apparatus 400, and the inertial measurement unit data includes an angular velocity and an acceleration of the first control apparatus 400 in a three-dimensional space. The inertial measurement unit sensor module 401 may include three single-axis accelerometers, three single-axis gyroscopes, and three single-axis magnetometers, and may measure and report a speed, a direction, a gravity and the like via sensor combinations of the accelerometers, the gyroscopes and the magnetometers.

The camera module 402 is configured to collect point cloud data of an environment where the first control apparatus 400 is located. For example, the camera module 402 may include a plurality of fisheye cameras, and when the first control apparatus 400 is in a self-tracking mode, each fisheye camera is configured to collect point cloud data of the environment where the first control apparatus 400 is located.

The linear motor module 403 is configured to provide a user with an interaction feedback such as vibration. For example, when the user presses a certain key of the first control apparatus 400, the linear motor module 403 is configured to generate a vibration as feedback, or, when the motion range of the first control apparatus or a second control apparatus exceeds a security area, the linear motor module 403 is configured to generate a vibration as a prompt, so that the user has better experience.

The wireless communication module 404 is configured to perform a communication between the first control apparatus and the second control apparatus. For example, the wireless communication module 404 may send, to the second control apparatus, six-degrees-of-freedom data, inertial measurement unit data, key data, a time synchronization message, point cloud data and the like of the first control apparatus. The wireless communication module 404 may further receive point cloud data, a time synchronization message, control information and the like, which are sent by the second control apparatus to the first control apparatus. The wireless communication module 404 may include a wireless chip, and the wireless communication module 404 may further include the ANT 405.

The touch key input module 406 is configured to provide the user with a key or a touch operation on the first control apparatus.

The user input module 407 is configured to provide the user with an input operation on the first control apparatus.

The processor 408 is configured to execute the above method embodiments according to instructions in the computer program, for example, to process data interaction between the first control apparatus and the second control apparatus, to determine six-degrees-of-freedom data according to the point cloud data and the inertial measurement unit data, etc.

In some embodiments of the present application, the processor 408 may include, but is not limited to, a general-purpose processor, a digital signal processor (DSP), an application specific integrated circuit (ASIC), a field programmable gate array (FPGA) or other programmable logic devices, a discrete gate or transistor logic device, a discrete hardware component, etc.

It should be understood that the components in the first control apparatus 400 are connected by a bus system, wherein the bus system further includes, in addition to a data bus, a power bus, a control bus, a status signal bus, etc.

Figure 5:
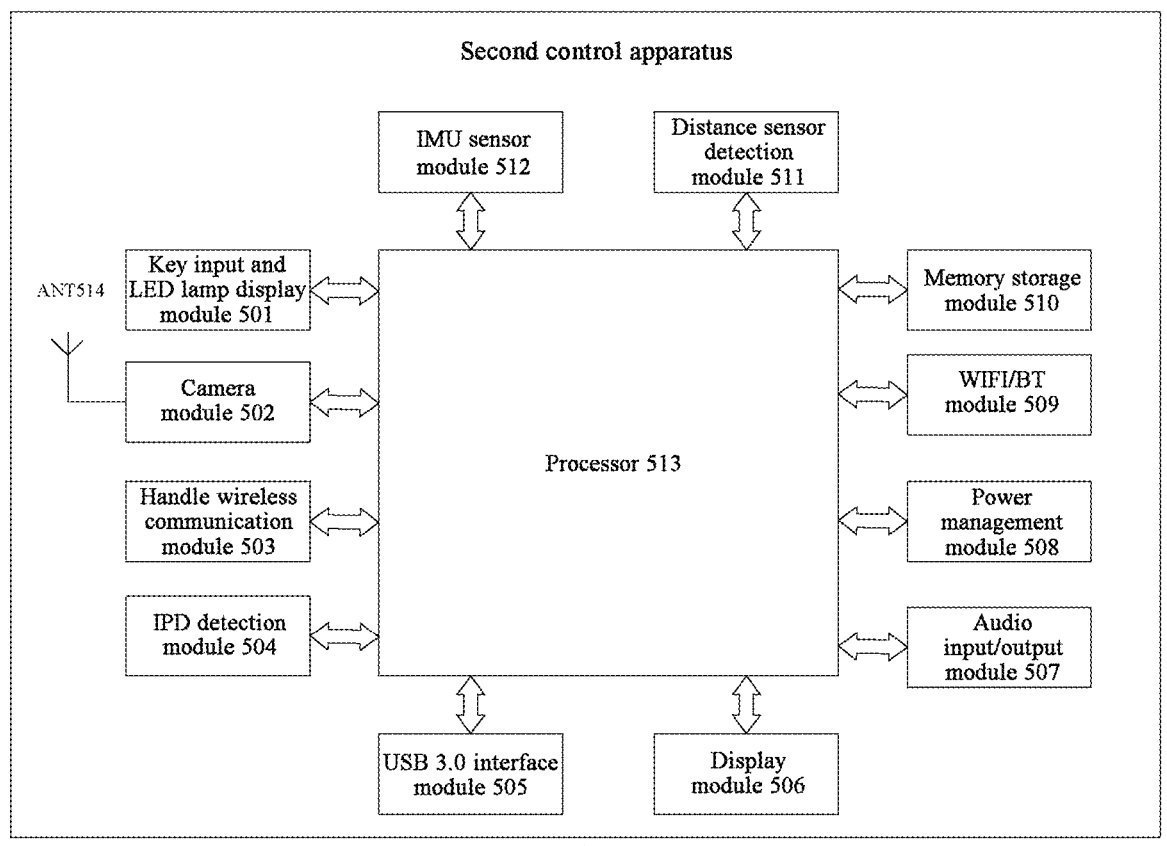
FIG. 5 is a schematic block diagram of a second control apparatus 500 provided in an embodiment of the present application.

FIG. 5 is a schematic block diagram of a second control apparatus 500 provided in an embodiment of the present application. The second control apparatus 500 may be the head-mounted display in the above embodiments.

As shown in FIG. 5, the second control apparatus 500 may include one or more of the following components: a key input and LED lamp display module 501, a camera module 502, a handle wireless communication module 503, an IPD detection module 504, a USB 3.0 interface module 505, a display module 506, an audio input/output module 507, a power management module 508, a WIFI/BT module 509, a memory storage module 510, a distance sensor detection module 511, an IMU sensor module 512, a processor 513, and an ANT 514.

The key input and LED lamp display module 501 is configured to provide the user with a key or input operation on the first control apparatus and display of a prompt lamp such as startup.

The camera module 502 is configured to collect point cloud data of an environment where the second control apparatus 500 is located. For example, the camera module 502 may include a plurality of fisheye cameras, and each fisheye camera is configured to collect point cloud data of the environment where the second control apparatus 500 is located.

The handle wireless communication module 503 is configured to perform a communication between the first control apparatus and the second control apparatus. For example, the handle wireless communication module 503 may send, to the first control apparatus, 6DOF data, inertial measurement unit data, key data, a time synchronization message, point cloud data and the like of the second control apparatus, and the handle wireless communication module 503 may further receive point cloud data, a time synchronization message, control information and the like, which are sent by the first control apparatus to the second control apparatus. The handle wireless communication module 503 may include a wireless chip, such as a Bluetooth chip, a WiFi chip, an ad chip, and an ultra wide band (UWB) chip. The handle wireless communication module 503 may further include the ANT 514. Further, the handle wireless communication module 503 may further include a processor.

The IPD detection module 504 is configured to detect an interpupillary spacing of the user.

The USB 3.0 interface module 505 is configured to connect an external device.

The display module 506 is configured to display an image in the second control apparatus. The display module 506 may adjust, in real time according to the 6DOF data of the handle and the HMD, the image displayed in the second control apparatus.

The audio input/output module 507 is configured to input or output audio data. The audio input/output module 507 may receive voice data input by the user, and may further output audio data to the user. The audio input/output module 507 may include a loudspeaker, a microphone, a speaker, etc.

The power management module 508 is configured to allocate and provide power to each component of the second control apparatus 500.

The WIFI/BT module 509 is configured to perform a communication between the first control apparatus and the second control apparatus. For example, the WIFI/BT module 509 may send, to the first control apparatus, the 6DOF data, the inertial measurement unit data, the key data, the time synchronization message, the point cloud data and the like of the second control apparatus, and the WIFI/BT module 509 may further receive the point cloud data, the time synchronization message, the control information and the like, which are sent by the handle.

The memory storage module 510 is configured to store a computer program, point cloud data, etc.

In some embodiments of the present application, the memory storage module 510 includes, but is not limited to, a volatile memory and/or a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example and not limitation, many forms of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synch link dynamic random access memory (synch link DRAM, SLDRAM), and a direct rambus random access memory (Direct Rambus RAM, DR RAM).

The distance sensor detection module 511 is configured to detect motion ranges of the HMD and the handle, so that the movement ranges of the first control apparatus and the movement range of the second control apparatus are kept in the security area.

The IMU sensor module 512 is configured to detect IMU data of the second control apparatus 500, and the IMU data includes an angular velocity and an acceleration of the second control apparatus 500 in a three-dimensional space. The IMU sensor module 512 may include three single-axis accelerometers, three single-axis gyroscopes and three single-axis magnetometers, and may measure and report a speed, a direction, a gravity and the like via sensor combinations of the accelerometers, the gyroscopes and the magnetometers.

The processor 513 is configured to execute the above method embodiments according to instructions in the computer program, for example, process data interaction between the first control apparatus and the second control apparatus, and determine six-degrees-of-freedom data according to the point cloud data and the inertial measurement unit data, etc.

In some embodiments of the present application, the processor 513 may include, but is not limited to, a general-purpose processor, a digital signal processor (DSP), an application specific integrated circuit (ASIC), a field programmable gate array (FPGA) or other programmable logic devices, a discrete gate or transistor logic device, a discrete hardware component, etc.

It should be understood that the components in the second control apparatus 500 are connected by a bus system, wherein the bus system further includes, in addition to a data bus, a power bus, a control bus, a status signal bus, etc.

The present application further provides a computer storage medium, storing a computer program thereon, wherein when the computer program is executed by a computer, the computer is caused to execute the method in the above method embodiments.

An embodiment of the present application further provides a computer program product, including an instruction, wherein when the instruction is executed by a computer, the computer is caused to execute the method in the above method embodiments.

When the embodiments of the present application are implemented by using software, all or part of the embodiments may be implemented in the form of a computer program product. The computer program product includes one or more computer instructions. When the computer program instruction is loaded and executed on a computer program instruction, flows or functions according to the embodiments of the present application are all or partially generated. The computer may be a general-purpose computer, a special-purpose computer, a computer network, or another programmable apparatuses. The computer instruction may be stored in a computer-readable storage medium or transmitted from one computer-readable storage medium to another computer-readable storage medium, for example, the computer instruction may be transmitted from one website, computer, server or data center to another website, computer, server or data center in a wired manner (e.g., a coaxial cable, an optical fiber, a digital subscriber line (DSL)), or a wireless manner (e.g., infrared, wireless, microwave, or the like). The computer-readable storage medium may be any available medium accessible by the computer, or includes data storage devices, such as a server or a data center, which integrates one or more available media. The available medium may be a magnetic medium (e.g., a floppy disk, a hard disk and a magnetic tape), an optical medium (e.g., a digital video disk (DVD)), a semiconductor medium (e.g., a solid state disk (SSD)), etc.

The above descriptions are merely specific implementations of the present application, but the protection scope of the present application is not limited thereto. Any skilled one who is familiar with this art could readily think of variations or substitutions within the disclosed technical scope of the present application, and these variations or substitutions shall fall within the protection scope of the present application. Accordingly, the protection scope of the present application should be subject to the protection scope of the claims.

I claim:

1. A localization method for a control apparatus, wherein the method is applied to a first control apparatus, a camera is installed on the first control apparatus, and the method comprises:

collecting, by the camera and at a moment T1, an external environment where the first control apparatus is located, thereby obtaining first point cloud data;

acquiring inertial measurement unit data of the first control apparatus at the moment T1 and a first point cloud map of the external environment; and determining six-degrees-of-freedom data of the first control apparatus according to the first point cloud data, the inertial measurement unit data and the first point cloud map, wherein the first point cloud map comprises historical point cloud data that is collected by the first control apparatus and a second control apparatus from the external environment relative to the moment T1;

wherein the method further comprises:

comparing whether there is a difference between the first point cloud data and the first point cloud map; and in a case where there is a difference between the first point cloud data and the first point cloud map, updating a difference part between the first point cloud data and the first point cloud map into the first point cloud map, and sending the difference part between the first point cloud data and the first point cloud map to the second control apparatus.

2. The method according to claim 1, wherein updating the difference part between the first point cloud data and the first point cloud map into the first point cloud map, and sending the difference part between the first point cloud data and the first point cloud map to the second control apparatus comprises:

when a target condition is satisfied, updating the difference part between the first point cloud data and the first point cloud map into the first point cloud map, and sending the difference part between the first point cloud data and the first point cloud map to the second control apparatus.

3. The method according to claim 2, wherein the target condition comprises at least one of the following that:

a preset duration after the moment T1 is reached; or a cumulative size of the difference part between the first point cloud data and the first point cloud map and a difference part between point cloud data, which is collected by the camera from the external environment after the moment T1, and the first point cloud map reaches a preset size.

4. The method according to claim 3, further comprising:

receiving a difference part, which is sent by the second control apparatus, between second point cloud data and the first point cloud map; and updating a difference part between the second point cloud data and the first point cloud map into the first point cloud map, wherein the second point cloud data is point cloud data obtained by the second control apparatus by collecting the external environment at the moment T1 by a camera of the second control apparatus.

5. The method according to claim 1, further comprising: before collecting, by the camera and at the moment T1, the external environment where the first control apparatus is located, thereby obtaining first point cloud data, switching a mode of the first control apparatus from an initial mode to a self-tracking mode, wherein the initial mode is a mode in which the first control apparatus is operated by an arm model.

6. The method according to claim 5, further comprising:

when the mode of the first control apparatus is the initial mode, receiving historical point cloud data that is collected by the second control apparatus from the external environment relative to a moment T2; and determining a second point cloud map according to the historical point cloud data that is collected by the second control apparatus from the external environment relative to the moment T2.

7. The method according to claim 1, wherein the first point cloud map is stored in a target database; and the target database is a database shared by the first control apparatus and the second control apparatus.

8. A control apparatus, comprising:

a processor; and a memory, configured to store an executable instruction of the processor, wherein the processor is configured to, via executing the executable instruction:

collect, by a camera and at a moment T1, an external environment where a first control apparatus is located, thereby obtaining first point cloud data;

acquire inertial measurement unit data of the first control apparatus at the moment T1 and a first point cloud map of the external environment; and determine six-degrees-of-freedom data of the first control apparatus according to the first point cloud data, the inertial measurement unit data and the first point cloud map, wherein the first point cloud map comprises historical point cloud data that is collected by the first control apparatus and a second control apparatus from the external environment relative to the moment T1;

wherein the processor is further configured to:

compare whether there is a difference between the first point cloud data and the first point cloud map; and in a case where there is a difference between the first point cloud data and the first point cloud map, update a difference part between the first point cloud data and the first point cloud map into the first point cloud map, and send the difference part between the first point cloud data and the first point cloud map to the second control apparatus.

9. A non-volatile computer-readable storage medium, storing a computer program thereon, wherein the computer program, when executed by a processor, implements:

collecting, by a camera and at a moment T1, an external environment where a first control apparatus is located, thereby obtaining first point cloud data;

acquiring inertial measurement unit data of the first control apparatus at the moment T1 and a first point cloud map of the external environment; and determining six-degrees-of-freedom data of the first control apparatus according to the first point cloud data, the inertial measurement unit data and the first point cloud map, wherein the first point cloud map comprises historical point cloud data that is collected by the first control apparatus and a second control apparatus from the external environment relative to the moment T1;

wherein the computer program further implements:

comparing whether there is a difference between the first point cloud data and the first point cloud map; and in a case where there is a difference between the first point cloud data and the first point cloud map, updating a difference part between the first point cloud data and the first point cloud map into the first point cloud map, and sending the difference part between the first point cloud data and the first point cloud map to the second control apparatus.

10. The control apparatus according to claim 8, wherein the processor is configured to update the difference part between the first point cloud data and the first point cloud map into the first point cloud map, and send the difference part between the first point cloud data and the first point cloud map to the second control apparatus by being configured to:

when a target condition is satisfied, update the difference part between the first point cloud data and the first point cloud map into the first point cloud map, and send the difference part between the first point cloud data and the first point cloud map to the second control apparatus.

11. The control apparatus according to claim 10, wherein the target condition comprises at least one of the following that:

a preset duration after the moment T1 is reached; or a cumulative size of the difference part between the first point cloud data and the first point cloud map and a difference part between point cloud data, which is collected by the camera from the external environment after the moment T1, and the first point cloud map reaches a preset size.

12. The control apparatus according to claim 11, wherein the processor is further configured to:

receive a difference part, which is sent by the second control apparatus, between second point cloud data and the first point cloud map, which is sent by the second control apparatus; and update a difference part between the second point cloud data and the first point cloud map into the first point cloud map, wherein the second point cloud data is point cloud data obtained by the second control apparatus by collecting the external environment at the moment T1 by a camera of the second control apparatus.

13. The control apparatus according to claim 8, wherein the processor is further configured to: before collecting, by the camera and at the moment T1, the external environment where the first control apparatus is located, thereby obtaining first point cloud data, switch a mode of the first control apparatus from an initial mode to a self-tracking mode, wherein the initial mode is a mode in which the first control apparatus is operated by an arm model.

14. The control apparatus according to claim 13, wherein the processor is further configured to:

when the mode of the first control apparatus is the initial mode, receive historical point cloud data that is collected by the second control apparatus from the external environment relative to a moment T2; and determine a second point cloud map according to the historical point cloud data that is collected by the second control apparatus from the external environment relative to the moment T2.

15. The control apparatus according to claim 8, wherein the first point cloud map is stored in a target database; and the target database is a database shared by the first control apparatus and the second control apparatus.

16. The non-volatile computer-readable storage medium according to claim 9, wherein updating the difference part between the first point cloud data and the first point cloud map into the first point cloud map, and sending the difference part between the first point cloud data and the first point cloud map to the second control apparatus comprises:

when a target condition is satisfied, updating the difference part between the first point cloud data and the first point cloud map into the first point cloud map, and sending the difference part between the first point cloud data and the first point cloud map to the second control apparatus.

17. The non-volatile computer-readable storage medium according to claim 16, wherein the target condition comprises at least one of the following that:

a preset duration after the moment T1 is reached; or a cumulative size of the difference part between the first point cloud data and the first point cloud map and a difference part between point cloud data, which is collected by the camera from the external environment after the moment T1, and the first point cloud map reaches a preset size.

* * * * *